(12) United States Patent
Mondal et al.

(10) Patent No.: US 11,949,613 B2
(45) Date of Patent: Apr. 2, 2024

(54) SCHEDULING FOR NEW RADIO IN UNLICENSED SPECTRUM (NR-U)

(71) Applicant: Apple Inc., Cupertino, CA (US)

(72) Inventors: Bishwarup Mondal, San Ramon, CA (US); Salvatore Talarico, Sunnyvale, CA (US); Seau S. Lim, Swindon (GB); Dae Won Lee, Portland, OR (US); Jeongho Jeon, San Jose, CA (US)

(73) Assignee: Apple Inc., Cupertino, CA (US)

( * ) Notice: Subject to any disclaimer, the term of this patent is extended or adjusted under 35 U.S.C. 154(b) by 490 days.

(21) Appl. No.: 17/259,102

(22) PCT Filed: Aug. 9, 2019

(86) PCT No.: PCT/US2019/045853
§ 371 (c)(1),
(2) Date: Jan. 8, 2021

(87) PCT Pub. No.: WO2020/033798
PCT Pub. Date: Feb. 13, 2020

(65) Prior Publication Data
US 2021/0328738 A1   Oct. 21, 2021

Related U.S. Application Data

(60) Provisional application No. 62/717,704, filed on Aug. 10, 2018.

(51) Int. Cl.
*H04W 4/00* (2018.01)
*H04L 5/00* (2006.01)
*H04W 72/20* (2023.01)

(52) U.S. Cl.
CPC .......... *H04L 5/0048* (2013.01); *H04W 72/20* (2023.01)

(58) Field of Classification Search
CPC .... H04W 72/12; H04W 72/1278; H04L 5/00; H04L 5/0048
(Continued)

(56) References Cited

U.S. PATENT DOCUMENTS 10,582,486 B2 *   3/2020   Nam ............... H04W 24/10
10,952,235 B2 *   3/2021   Zhou .............. H04W 48/12
(Continued)

FOREIGN PATENT DOCUMENTS

CN    108141342    6/2018
EP    3860022 A1   8/2021
(Continued)

OTHER PUBLICATIONS

ZTE, et al., "Considerations on RS/Channel Design and Measurement for NR-U"; 3GPP TSG RAN WG1, Meeting #92bis; R1-1803951; Sanya, China; Apr. 2018; 10 pgs.
(Continued)

*Primary Examiner* — Marceau Milord
(74) *Attorney, Agent, or Firm* — Kowert, Hood, Munyon, Rankin & Goetzel, P.C.

(57) ABSTRACT

An apparatus of a network (NW) configured to: encode a new radio (NR) Discovery Reference Signal (DRS) transmission, the NR DRS transmission including a synchronization signal block (SSB) and channel state information (CSI) reference signal (RS) (CSI-RS). The apparatus is further configured to configure the NW to transmit the NR DRS transmission. The RS-CSI may be a fragmented RS-CSI including a first fragmented portion and a second fragmented portion, where the apparatus is configured to encode a symbol of the NR DRS transmission to comprise the first fragmented portion, a symbol of the SSB, and the (Continued)

second fragmented portion, where the symbol of the SSB is encoded on a physical broadcast channel (PBCH) portion of the NR DRS transmission.

20 Claims, 8 Drawing Sheets

(58) Field of Classification Search
USPC .......................................................... 370/329
See application file for complete search history.

(56) References Cited

U.S. PATENT DOCUMENTS

| | | | | |
|---|---|---|---|---|
| 10,993,248 B2* | 4/2021 | Ly | ........................ | H04W 72/23 |
| 11,533,779 B2* | 12/2022 | Wang | .................... | H04W 48/12 |
| 11,641,653 B2* | 5/2023 | Liu | ...................... | H04W 56/001 |
| | | | | 370/330 |
| 11,716,184 B2* | 8/2023 | Zhang | ................... | H04L 5/0094 |
| | | | | 370/329 |
| 11,722,982 B2* | 8/2023 | Shan | ..................... | H04W 76/11 |
| | | | | 370/254 |
| 2011/0170435 A1* | 7/2011 | Kim | ...................... | H04L 1/0693 |
| | | | | 370/252 |
| 2015/0242105 A1* | 8/2015 | Shin | ....................... | H04N 23/61 |
| | | | | 715/765 |
| 2016/0242105 A1* | 8/2016 | Schier | ................... | H04W 48/12 |
| 2019/0098590 A1* | 3/2019 | Nam | ...................... | H04W 72/23 |
| 2019/0149365 A1* | 5/2019 | Chatterjee | ............. | H04L 5/0094 |
| | | | | 370/329 |
| 2019/0342801 A1* | 11/2019 | Cui | ........................ | H04W 72/23 |
| 2020/0007287 A1* | 1/2020 | Kakishima | ............ | H04L 5/0094 |
| 2020/0053571 A1* | 2/2020 | Tsai | ...................... | H04L 5/0092 |
| 2020/0053798 A1* | 2/2020 | Tsai | ....................... | H04W 72/23 |
| 2020/0154376 A1* | 5/2020 | Ko | ......................... | H04W 72/30 |
| 2020/0205102 A1* | 6/2020 | Islam | .................... | H04W 24/10 |

FOREIGN PATENT DOCUMENTS

| | | |
|---|---|---|
| KR | 1020180089901 A | 8/2018 |
| WO | 2018045092 | 3/2018 |

OTHER PUBLICATIONS

Huawei, et al., "Remaining Issues in PBCH"; 3GPP TSG RAN WG1 NR#3; R1-1715386; Nagoya, Japan; Sep. 2017; 4 pgs.
Extended European Search Report; Application No. 19846258.2; dated Jan. 27, 2022; 11 pgs.
International Search Report and Written Opinion for International Application No. PCT/US2019/045853, dated Nov. 18, 2019, 10 pgs.
International Preliminary Report on Patentability for International Application No. PCT/US2019/045853, dated Jul. 17, 2020, 15 pgs.
Qualcomm Incorporated, 'Initial access and mobility procedures for NR unlicensed', R1-1807390, 3GPP TSG RAN WG1 #93, Busan, Korea, May 12, 2018, 4 pgs.
Ericsson, 'Frame structure for NR-U', R1-1806250, 3GPP TSG RAN WG1 #93, Busan, Korea, May 12, 2018, 4 pgs.
Qualcomm Incorporated, 'Potential phy procedure designs for NR unlicensed', R1-1804831, 3GPP TSG RAN WG1 #92bis, Sanya, China, Apr. 7, 2018, 9 pgs.
NTT DOCOMO, Inc., 'Remaining issues on measurement for mobility management', R1-1805037, 3GPP TSG RAN WG1 #92bis, Sanya, China, Apr. 6, 2018, 8 pgs.
First Office Action for CN Patent Application No. 201980053665X; dated Jan. 17, 2024.

* cited by examiner

SCHEDULING FOR NEW RADIO IN UNLICENSED SPECTRUM (NR-U)

PRIORITY CLAIM

This application claims the benefit of priority to the U.S. Provisional Patent Application Ser. No. 62/717,704, filed Aug. 10, 2018, and entitled "SYNCHRONIZATION SIGNAL BLOCK (SSB) INDEX SCHEDULING FOR NEW RADIO IN UNLICENSED SPECTRUM (NR-U)," which patent application is incorporated herein by reference in its entirety.

TECHNICAL FIELD

Aspects pertain to wireless communications. Some aspects relate to wireless networks including 3GPP (Third Generation Partnership Project) networks, 3GPP LTE (Long Term Evolution) networks, 3GPP LTE-A (LTE Advanced) networks, and fifth-generation (5G) networks including 5G new radio (NR) (or 5G-NR) networks, 5G-LTE networks, and Institute of Electrical and Electronic Engineers (IEEE) 802.11 communication protocols.

BACKGROUND

Mobile communications have evolved significantly from early voice systems to today's highly sophisticated integrated communication platform. With the increase in different types of devices communicating with various network devices, usage of 3GPP LTE systems has increased. The penetration of mobile devices (user equipment or UEs) in modern society has continued to drive demand for a wide variety of networked devices in a number of disparate environments. Fifth generation (5G) wireless systems are forthcoming and are expected to enable even greater speed, connectivity, and usability. Next generation 5G networks (or NR networks) are expected to increase throughput, coverage, and robustness and reduce latency and operational and capital expenditures. 5G-NR networks will continue to evolve based on 3GPP LTE-Advanced with additional potential new radio access technologies (RATs) to enrich people's lives with seamless wireless connectivity solutions delivering fast, rich content and services. As current cellular network frequency is saturated, higher frequencies, such as millimeter wave (mmWave) frequency, can be beneficial due to their high bandwidth.

Potential operation in the unlicensed spectrum includes (and is not limited to) the operation in the unlicensed spectrum via dual connectivity (DC), or DC-based LAA, and the standalone LTE system in the unlicensed spectrum, according to which LTE-based technology solely operates in unlicensed spectrum without requiring an "anchor" in the licensed spectrum, called MulteFire. MulteFire combines the performance benefits of LTE technology with the simplicity of Wi-Fi-like deployments.

DETAILED DESCRIPTION

The following description and the drawings sufficiently illustrate aspects to enable those skilled in the art to practice them. Other aspects may incorporate structural, logical, electrical, process, and other changes. Portions and features of some aspects may be included in, or substituted for, those of other aspects. Aspects set forth in the claims encompass all available equivalents of those claims.

Figure 1A:
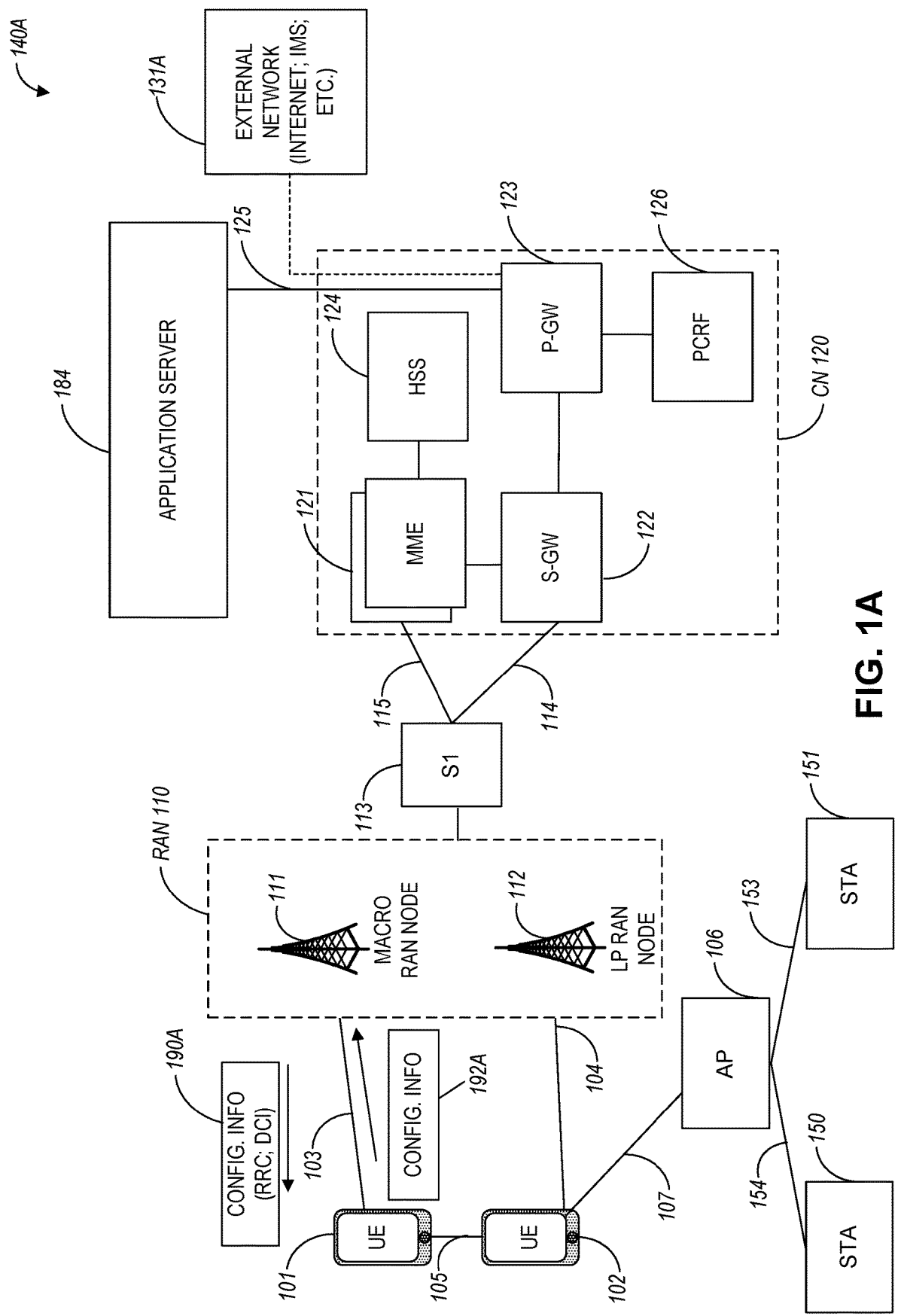
FIG. 1A illustrates an architecture of a network, in accordance with some aspects.

FIG. 1A illustrates an architecture of a network in accordance with some aspects. The network 140A is shown to include user equipment (UE) 101 and UE 102. The UEs 101 and 102 are illustrated as smartphones (e.g., handheld touchscreen mobile computing devices connectable to one or more cellular networks) but may also include any mobile or non-mobile computing device, such as Personal Data Assistants (PDAs), pagers, laptop computers, desktop computers, wireless handsets, drones, or any other computing device including a wired and/or wireless communications interface. The UEs 101 and 102 can be collectively referred to herein as UE 101, and UE 101 can be used to perform one or more of the techniques disclosed herein.

Any of the radio links described herein (e.g., as used in the network 140A or any other illustrated network) may operate according to any exemplary radio communication technology and/or standard.

LTE and LTE-Advanced are standards for wireless communications of high-speed data for UE such as mobile telephones. In LTE-Advanced and various wireless systems, carrier aggregation is a technology according to which multiple carrier signals operating on different frequencies may be used to carry communications for a single UE, thus increasing the bandwidth available to a single device. In some embodiments, carrier aggregation may be used where one or more component carriers operate on unlicensed frequencies.

There are emerging interests in the operation of LTE systems in the unlicensed spectrum. As a result, an important enhancement for LTE in 3GPP Release 13 has been to enable its operation in the unlicensed spectrum via Licensed-Assisted Access (LAA), which expands the system bandwidth by utilizing the flexible carrier aggregation (CA)

framework introduced by the LTE-Advanced system. Rel-13 LAA system focuses on the design of downlink operation on unlicensed spectrum via CA, while Rel-14 enhanced LAA (eLAA) system focuses on the design of uplink operation on unlicensed spectrum via CA.

Aspects described herein can be used in the context of any spectrum management scheme including, for example, dedicated licensed spectrum, unlicensed spectrum, (licensed) shared spectrum (such as Licensed Shared Access (LSA) in 2.3-2.4 GHz, 3.4-3.6 GHz, 3.6-3.8 GHz, and further frequencies and Spectrum Access System (SAS) in 3.55-3.7 GHz and further frequencies). Additionally, spectrum may be spectrums used by IEEE 802.11 compliant STAs 150, 151, e.g., 2.5 GHz, 5 GHz, and/or 6 GHz. Applicable exemplary spectrum bands include IMT (International Mobile Telecommunications) spectrum (including 450-470 MHz, 790-960 MHz, 1710-2025 MHz, 2110-2200 MHz, 2300-2400 MHz, 2500-2690 MHz, 698-790 MHz, 610-790 MHz, 3400-3600 MHz, to name a few), IMT-advanced spectrum, IMT-2020 spectrum (expected to include 3600-3800 MHz, 3.5 GHz bands, 700 MHz bands, bands within the 24.25-86 GHz range, for example), spectrum made available under the Federal Communications Commission's "Spectrum Frontier" 5G initiative (including 27.5-28.35 GHz, 29.1-29.25 GHz, 31-31.3 GHz, 37-38.6 GHz, 38.6-40 GHz, 42-42.5 GHz, 57-64 GHz, 71-76 GHz, 81-86 GHz and 92-94 GHz, etc), the ITS (Intelligent Transport Systems) band of 5.9 GHz (typically 5.85-5.925 GHz) and 63-64 GHz, bands currently allocated to WiGig such as WiGig Band 1 (57.24-59.40 GHz), WiGig Band 2 (59.40-61.56 GHz), WiGig Band 3 (61.56-63.72 GHz), and WiGig Band 4 (63.72-65.88 GHz); the 70.2 GHz-71 GHz band; any band between 65.88 GHz and 71 GHz; bands currently allocated to automotive radar applications such as 76-81 GHz; and future bands including 94-300 GHz and above. Furthermore, the scheme can be used on a secondary basis on bands such as the TV White Space bands (typically below 790 MHz) wherein particular the 400 MHz and 700 MHz bands can be employed. Besides cellular applications, specific applications for vertical markets may be addressed, such as PMSE (Program Making and Special Events), medical, health, surgery, automotive, low-latency, drones, and the like.

Aspects described herein can also be applied to different Single Carrier or OFDM flavors (CP-OFDM, SC-FDMA, SC-OFDM, filter bank-based multicarrier (FBMC), OFDMA, etc.) and in particular 3GPP NR (New Radio) by allocating the OFDM carrier data bit vectors to the corresponding symbol resources.

In some embodiments, any of the UEs 101 and 102 can comprise an Internet-of-Things (IoT) UE or a Cellular IoT (CIoT) UE, which can comprise a network access layer designed for low-power IoT applications utilizing short-lived UE connections. In some embodiments, any of the UEs 101 and 102 can include a narrowband (NB) IoT UE (e.g., such as an enhanced NB-IoT (eNB-IoT) UE and Further Enhanced (FeNB-IoT) UE). An IoT UE can utilize technologies such as machine-to-machine (M2M) or machine-type communications (MTC) for exchanging data with an MTC server or device via a public land mobile network (PLMN), Proximity-Based Service (ProSe) or device-to-device (D2D) communication, sensor networks, or IoT networks. The M2M or MTC exchange of data may be a machine-initiated exchange of data. An IoT network includes interconnecting IoT UEs, which may include uniquely identifiable embedded computing devices (within the Internet infrastructure), with short-lived connections. The IoT UEs may execute background applications (e.g., keep-alive messages, status updates, etc.) to facilitate the connections of the IoT network.

In some embodiments, NB-IoT devices can be configured to operate in a single physical resource block (PRB) and may be instructed to retune two different PRBs within the system bandwidth. In some embodiments, an eNB-IoT UE can be configured to acquire system information in one PRB, and then it can retune to a different PRB to receive or transmit data.

In some embodiments, any of the UEs 101 and 102 can include enhanced MTC (eMTC) UEs or further enhanced MTC (FeMTC) UEs. The UEs 101 and 102 may be configured to connect, e.g., communicatively couple, with a radio access network (RAN) 110. The RAN 110 may be, for example, an Evolved Universal Mobile Telecommunications System (UMTS) Terrestrial Radio Access Network (E-UTRAN), a NextGen RAN (NG RAN), or some other type of RAN. The UEs 101 and 102 utilize connections 103 and 104, respectively, each of which comprises a physical communications interface or layer (discussed in further detail below); in this example, the connections 103 and 104 are illustrated as an air interface to enable communicative coupling, and can be consistent with cellular communications protocols, such as a Global System for Mobile Communications (GSM) protocol, a code-division multiple access (CDMA) network protocol, a Push-to-Talk (PTT) protocol, a PTT over Cellular (POC) protocol, a Universal Mobile Telecommunications System (UMTS) protocol, a 3GPP Long Term Evolution (LTE) protocol, a fifth generation (5G) protocol, a New Radio (NR) protocol, and the like.

In some embodiments, the network 140A can include a core network (CN) 120. Various aspects of NG RAN and NG Core are discussed herein in reference to, e.g., FIG. 1B, FIG. 1C, and FIG. 1D.

In an aspect, the UEs 101 and 102 may further directly exchange communication data via a ProSe interface 105. The ProSe interface 105 may alternatively be referred to as a sidelink interface comprising one or more logical channels, including but not limited to a Physical Sidelink Control Channel (PSCCH), a Physical Sidelink Shared Channel (PSSCH), a Physical Sidelink Discovery Channel (PSDCH), and a Physical Sidelink Broadcast Channel (PSBCH).

The UE 102 is shown to be configured to access an access point (AP) 106 via connection 107. The connection 107 can comprise a local wireless connection, such as, for example, a connection consistent with any IEEE 802.11 protocol, according to which the AP 106 can comprise a wireless fidelity (WiFi®) router. In this example, the AP 106 is shown to be connected to the Internet without connecting to the core network of the wireless system (described in further detail below). The AP 106 and stations (STAs) 150, 151 may be configured to operate in accordance with one or more IEEE 802.11 protocols, e.g., IEEE 802.11a/b/g/n/n-Greenfield (GF)//ac/ad/af/ah/aj/ay/ax/ab (extremely high-throughput, EHT) with each other and the AP 106. The UE 101, 102, AP 106, and STAs 150, 151 may be configured to operate in the 2.4/5/6 Gigahertz radio spectrum. The UEs 101, 102, and RAN 110 (e.g., NG interface to the 5GC 120 may be configured to transmit a preamble as disclosed herein that is compatible with one or more preambles of IEEE 802.11. The preambles may be used to defer the AP 106 and/or STAs 150, 151.

The RAN 110 can include one or more access nodes that enable the connections 103 and 104. These access nodes (ANs) can be referred to as base stations (BSs), NodeBs, evolved NodeBs (eNBs), Next Generation NodeBs (gNBs), RAN nodes, and the like, and can comprise ground stations (e.g., terrestrial access points) or satellite stations providing coverage within a geographic area (e.g., a cell). In some embodiments, the communication nodes 111 and 112 can be transmission/reception points (TRPs). In instances when the communication nodes 111 and 112 are NodeBs (e.g., eNBs or gNBs), one or more TRPs can function within the communication cell of the NodeBs. The RAN 110 may include one or more RAN nodes for providing macrocells, e.g., macro RAN node 111, and one or more RAN nodes for providing femtocells or picocells (e.g., cells having smaller coverage areas, smaller user capacity, or higher bandwidth compared to macrocells), e.g., low power (LP) RAN node 112.

Any of the RAN nodes 111 and 112 can terminate the air interface protocol and can be the first point of contact for the UEs 101 and 102. In some embodiments, any of the RAN nodes 111 and 112 can fulfill various logical functions for the RAN 110 including, but not limited to, radio network controller (RNC) functions such as radio bearer management, uplink and downlink dynamic radio resource management and data packet scheduling, and mobility management. In an example, any of the nodes 111 and/or 112 can be a new generation node-B (gNB), an evolved node-B (eNB), or another type of RAN node.

In accordance with some aspects, the UEs 101 and 102 can be configured to communicate using Orthogonal Frequency-Division Multiplexing (OFDM) communication signals with each other or with any of the RAN nodes 111 and 112 over a multicarrier communication channel in accordance various communication techniques, such as, but not limited to, an Orthogonal Frequency-Division Multiple Access (OFDMA) communication technique (e.g., for downlink communications) or a Single Carrier Frequency Division Multiple Access (SC-FDMA) communication technique (e.g., for uplink and ProSe for sidelink communications), although such aspects are not required. The OFDM signals can comprise a plurality of orthogonal subcarriers.

In some embodiments, a downlink resource grid can be used for downlink transmissions from any of the RAN nodes 111 and 112 to the UEs 101 and 102, while uplink transmissions can utilize similar techniques. The grid can be a time-frequency grid, called a resource grid or time-frequency resource grid, which is the physical resource in the downlink in each slot. Such a time-frequency plane representation may be used for OFDM systems, which makes it applicable for radio resource allocation. Each column and each row of the resource grid may correspond to one OFDM symbol and one OFDM subcarrier, respectively. The duration of the resource grid in the time domain may correspond to one slot in a radio frame. The smallest time-frequency unit in a resource grid may be denoted as a resource element. Each resource grid may comprise a number of resource blocks, which describe the mapping of certain physical channels to resource elements. Each resource block may comprise a collection of resource elements; in the frequency domain, this may, in some embodiments, represent the smallest quantity of resources that currently can be allocated. There may be several different physical downlink channels that are conveyed using such resource blocks.

The physical downlink shared channel (PDSCH) may carry user data and higher-layer signaling to the UEs 101 and 102. The physical downlink control channel (PDCCH) may carry information about the transport format and resource allocations related to the PDSCH channel, among other things. It may also inform the UEs 101 and 102 about the transport format, resource allocation, and H-ARQ (Hybrid Automatic Repeat Request) information related to the uplink shared channel. Typically, downlink scheduling (assigning control and shared channel resource blocks to the UE 102 within a cell) may be performed at any of the RAN nodes 111 and 112 based on channel quality information fed back from any of the UEs 101 and 102. The downlink resource assignment information may be sent on the PDCCH used for (e.g., assigned to) each of the UEs 101 and 102.

The PDCCH may use control channel elements (CCEs) to convey the control information. Before being mapped to resource elements, the PDCCH complex-valued symbols may first be organized into quadruplets, which may then be permuted using a sub-block interleaver for rate matching. Each PDCCH may be transmitted using one or more of these CCEs, where each CCE may correspond to nine sets of four physical resource elements known as resource element groups (REGs). Four Quadrature Phase Shift Keying (QPSK) symbols may be mapped to each REG. The PDCCH can be transmitted using one or more CCEs, depending on the size of the downlink control information (DCI) and the channel condition. There can be four or more different PDCCH formats defined in LTE with different numbers of CCEs (e.g., aggregation level, L=1, 2, 4, or 8).

Some aspects may use concepts for resource allocation for control channel information that are an extension of the above-described concepts. For example, some aspects may utilize an enhanced physical downlink control channel (EPDCCH) that uses PDSCH resources for control information transmission. The EPDCCH may be transmitted using one or more enhanced control channel elements (ECCEs). Similar to above, each ECCE may correspond to nine sets of four physical resource elements known as an enhanced resource element groups (EREGs). An ECCE may have other numbers of EREGs according to some arrangements.

The RAN 110 is shown to be communicatively coupled to a core network (CN) 120 via an S1 interface 113. In aspects, the CN 120 may be an evolved packet core (EPC) network, a NextGen Packet Core (NPC) network, or some other type of CN (e.g., as illustrated in reference to FIGS. 1B-1D). In this aspect, the S1 interface 113 is split into two parts: the S1-U interface 114, which carries traffic data between the RAN nodes 111 and 112 and the serving gateway (S-GW) 122, and the S1-mobility management entity (MME) interface 115, which is a signaling interface between the RAN nodes 111 and 112 and MMEs 121.

In this aspect, the CN 120 comprises the MMEs 121, the S-GW 122, the Packet Data Network (PDN) Gateway (P-GW) 123, and a home subscriber server (HSS) 124. The MMEs 121 may be similar in function to the control plane of legacy Serving General Packet Radio Service (GPRS) Support Nodes (SGSN). The MMEs 121 may manage mobility aspects in access such as gateway selection and tracking area list management. The HSS 124 may comprise a database for network users, including subscription-related information to support the network entities' handling of communication sessions. The CN 120 may comprise one or several HSSs 124, depending on the number of mobile subscribers, on the capacity of the equipment, on the organization of the network, etc. For example, the HSS 124 can provide support for routing/roaming, authentication, authorization, naming/addressing resolution, location dependencies, etc.

The S-GW 122 may terminate the S1 interface 113 towards the RAN 110, and routes data packets between the RAN 110 and the CN 120. In addition, the S-GW 122 may be a local mobility anchor point for inter-RAN node handovers and also may provide an anchor for inter-3GPP mobility. Other responsibilities of the S-GW 122 may include a lawful intercept, charging, and some policy enforcement.

The P-GW 123 may terminate an SGi interface toward a PDN. The P-GW 123 may route data packets between the EPC network 120 and external networks such as a network including the application server 184 (alternatively referred to as application function (AF)) via an Internet Protocol (IP) interface 125. The P-GW 123 can also communicate data to other external networks 131A, which can include the Internet, IP multimedia subsystem (IPS) network, and other networks. Generally, the application server 184 may be an element offering applications that use IP bearer resources with the core network (e.g., UMTS Packet Services (PS) domain, LTE PS data services, etc.). In this aspect, the P-GW 123 is shown to be communicatively coupled to an application server 184 via an IP interface 125. The application server 184 can also be configured to support one or more communication services (e.g., Voice-over-Internet Protocol (VoIP) sessions, PTT sessions, group communication sessions, social networking services, etc.) for the UEs 101 and 102 via the CN 120.

The P-GW 123 may further be a node for policy enforcement and charging data collection. Policy and Charging Rules Function (PCRF) 126 is the policy and charging control element of the CN 120. In a non-roaming scenario, in some embodiments, there may be a single PCRF in the Home Public Land Mobile Network (HPLMN) associated with a UE's Internet Protocol Connectivity Access Network (IP-CAN) session. In a roaming scenario with a local breakout of traffic, there may be two PCRFs associated with a UE's IP-CAN session: a Home PCRF (H-PCRF) within an HPLMN and a Visited PCRF (V-PCRF) within a Visited Public Land Mobile Network (VPLMN). The PCRF 126 may be communicatively coupled to the application server 184 via the P-GW 123. The application server 184 may signal the PCRF 126 to indicate a new service flow and select the appropriate Quality of Service (QoS) and charging parameters. The PCRF 126 may provision this rule into a Policy and Charging Enforcement Function (PCEF) (not shown) with the appropriate traffic flow template (TFT) and QoS class of identifier (QCI), which commences the QoS and charging as specified by the application server 184.

In an example, any of the nodes 111 or 112 can be configured to communicate to the UEs 101, 102 (e.g., dynamically) an antenna panel selection and a receive (Rx) beam selection that can be used by the UE for data reception on a physical downlink shared channel (PDSCH) as well as for channel state information reference signal (CSI-RS) measurements and channel state information (CSI) calculation.

In an example, any of the nodes 111 or 112 can be configured to communicate to the UEs 101, 102 (e.g., dynamically) an antenna panel selection and a transmit (Tx) beam selection that can be used by the UE for data transmission on a physical uplink shared channel (PUSCH) as well as for sounding reference signal (SRS) transmission.

In some embodiments, the communication network 140A can be an IoT network. One of the current enablers of IoT is the narrowband-IoT (NB-IoT). NB-IoT has objectives such as coverage extension, UE complexity reduction, long battery lifetime, and backward compatibility with the LTE network. In addition, NB-IoT aims to offer deployment flexibility allowing an operator to introduce NB-IoT using a small portion of its existing available spectrum, and operate in one of the following three modalities: (a) standalone deployment (the network operates in re-farmed GSM spectrum); (b) in-band deployment (the network operates within the LTE channel); and (c) guard-band deployment (the network operates in the guard band of legacy LTE channels). In some embodiments, such as with further enhanced NB-IoT (FeNB-IoT), support for NB-IoT in small cells can be provided (e.g., in microcell, picocell or femtocell deployments). One of the challenges NB-IoT systems face for small cell support is the UL/DL link imbalance, where for small cells the base stations have lower power available compared to macro-cells, and, consequently, the DL coverage can be affected and/or reduced. In addition, some NB-IoT UEs can be configured to transmit at maximum power if repetitions are used for UL transmission. This may result in large inter-cell interference in dense small cell deployments.

In some embodiments, the UE 101 can operate in dual connectivity (DC) configuration with a master node (MN) and a secondary node (SN). The UE 101 can receive configuration information 190A (from MN or SN) via, e.g., higher layer signaling or other types of signaling. The configuration information 190A can include an indication for renegotiation of UE NR security capability, which can be used for activation of encryption/decryption and integrity protection of user plane traffic with the SN and control plane signaling traffic with the MN or the SN. In some embodiments, the configuration information 190A can be communicated directly by the SN via signaling radio bearer type 3 (SRB3) connection. In some embodiments, configuration information 192A can be communicated from the UE 101 to the SN or the MN for purposes of activation of encryption/decryption and integrity protection of user plane and control plane communications. For example, configuration information 192A can include UE NR-DC token which can be used in secure key derivation for protecting the user plane and control plane communications.

Figure 1B:
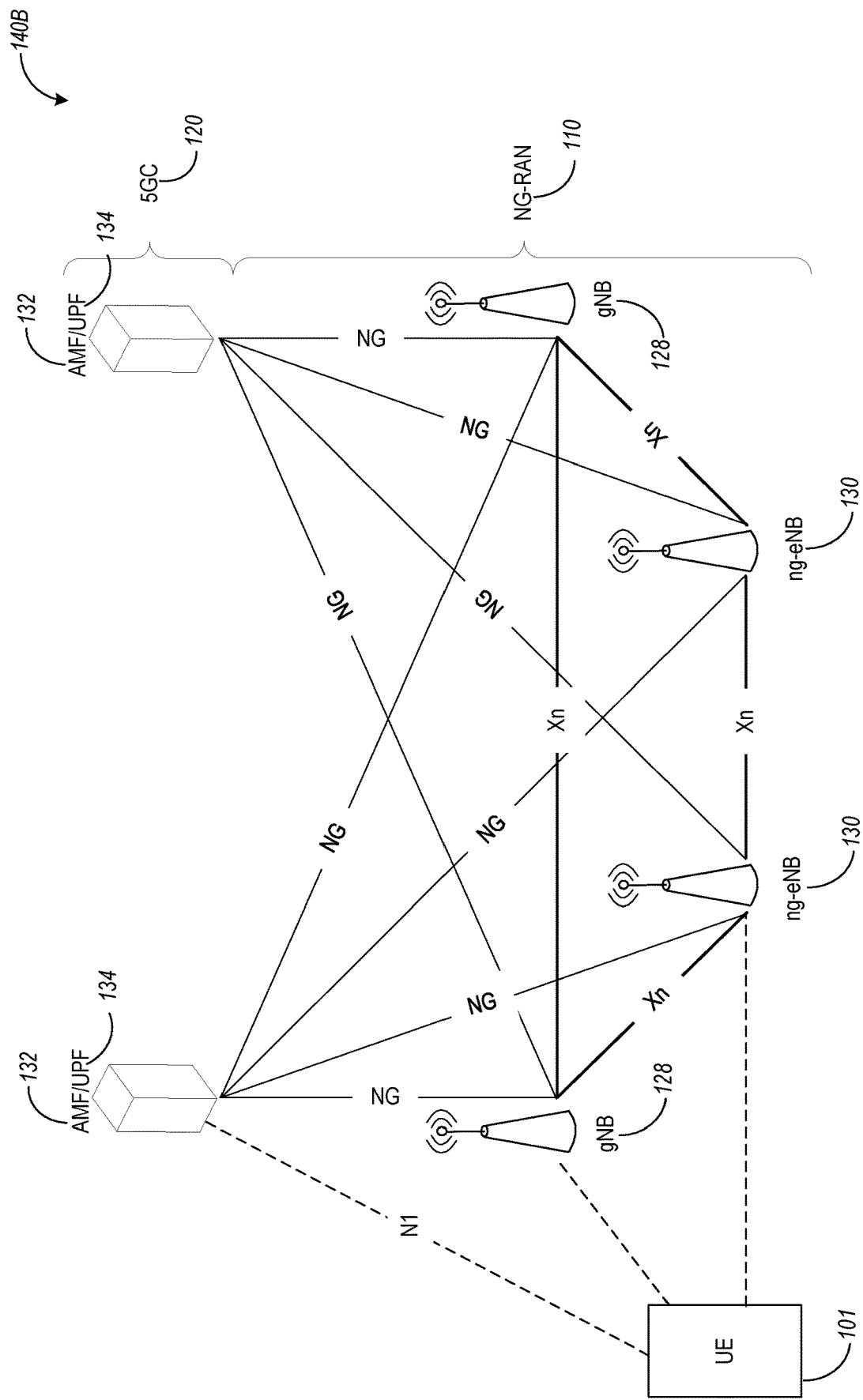
FIG. 1B is a simplified diagram of an overall next generation (NG) system architecture, in accordance with some aspects.

FIG. 1B is a simplified diagram of a next generation (NG) system architecture 140B in accordance with some aspects. Referring to FIG. 1B, the NG system architecture 140B includes RAN 110 and a 5G network core (5GC) 120. The NG-RAN 110 can include a plurality of nodes, such as gNBs 128 and NG-eNBs 130.

The core network 120 (e.g., a 5G core network or 5GC) can include an access and mobility management function (AMF) 132 and/or a user plane function (UPF) 134. The AMF 132 and the UPF 134 can be communicatively coupled to the gNBs 128 and the NG-eNBs 130 via NG interfaces. More specifically, in some embodiments, the gNBs 128 and the NG-eNBs 130 can be connected to the AMF 132 by NG-C interfaces, and to the UPF 134 by NG-U interfaces. The gNBs 128 and the NG-eNBs 130 can be coupled to each other via Xn interfaces.

In some embodiments, a gNB 128 can include a node providing new radio (NR) user plane and control plane protocol termination towards the UE and is connected via the NG interface to the 5GC 120. In some embodiments, an NG-eNB 130 can include a node providing evolved universal terrestrial radio access (E-UTRA) user plane and control plane protocol terminations towards the UE and is connected via the NG interface to the 5GC 120.

In some embodiments, the NG system architecture 140B can use reference points between various nodes as provided by 3GPP Technical Specification (TS) 23.501 (e.g., V15.4.0, 2018-12).

In some embodiments, each of the gNBs 128 and the NG-eNBs 130 can be implemented as a base station, a mobile edge server, a small cell, a home eNB, and so forth.

In some embodiments, node 128 can be a master node (MN) and node 130 can be a secondary node (SN) in a 5G architecture. The MN 128 can be connected to the AMF 132 via an NG-C interface and to the SN 128 via an XN-C interface. The MN 128 can be connected to the UPF 134 via an NG-U interface and to the SN 128 via an XN-U interface.

Figure 1C:
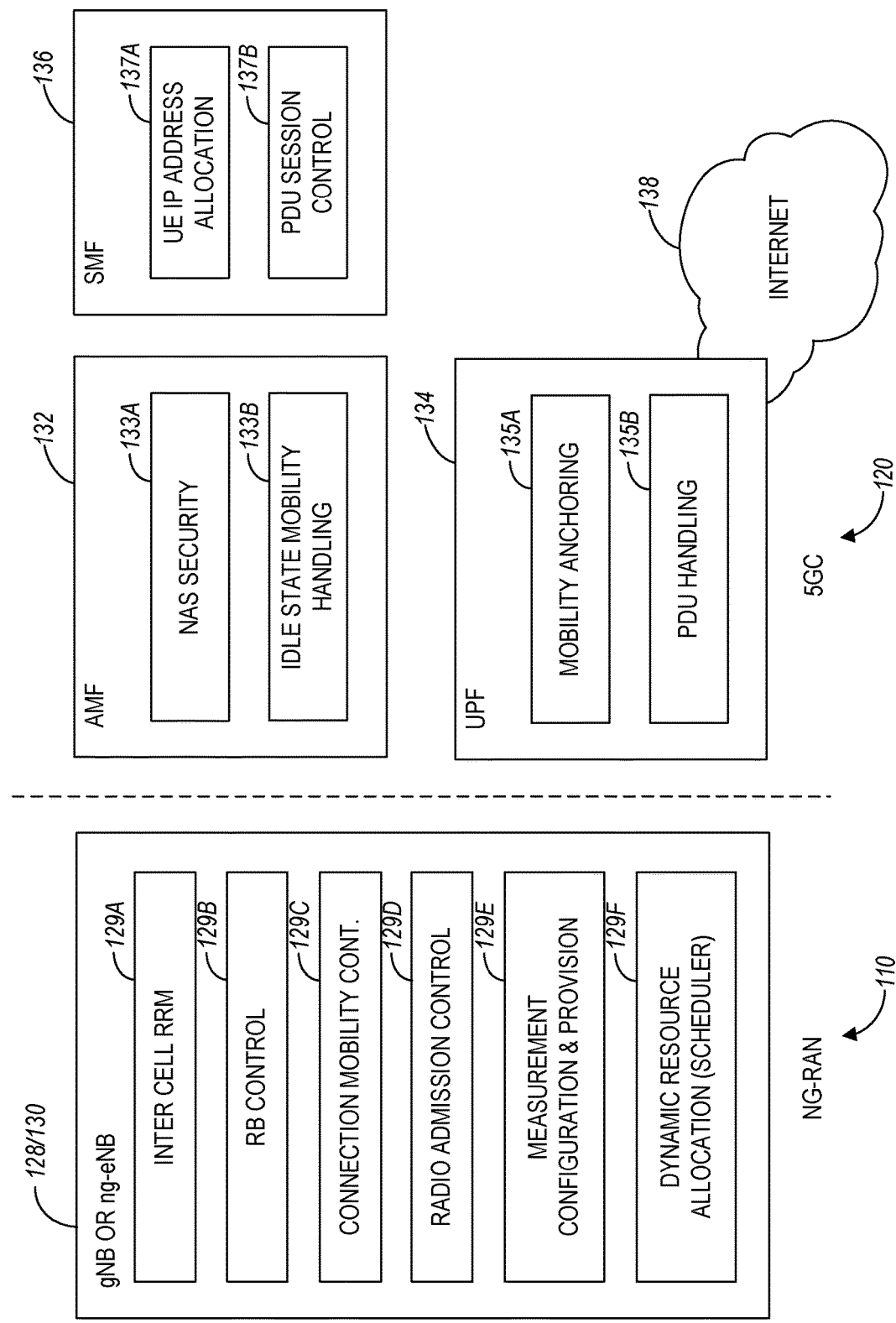
FIG. 1C illustrates a functional split between next generation radio access network (NG-RAN) and the 5G Core network (5GC), in accordance with some aspects.

FIG. 1C illustrates a functional split between NG-RAN and the 5G Core (5GC) in accordance with some aspects. Referring to FIG. 1C, there is illustrated a more detailed diagram of the functionalities that can be performed by the gNBs 128 and the NG-eNBs 130 within the NG-RAN 110, as well as the AMF 132, the UPF 134, and the SMF 136 within the 5GC 120. In some embodiments, the 5GC 120 can provide access to the Internet 138 to one or more devices via the NG-RAN 110.

In some embodiments, the gNBs 128 and the NG-eNBs 130 can be configured to host the following functions: functions for Radio Resource Management (e.g., inter-cell radio resource management 129A, radio bearer control 129B, connection mobility control 129C, radio admission control 129D, dynamic allocation of resources to UEs in both uplink and downlink (scheduling) 129F); IP header compression, encryption and integrity protection of data; selection of an AMF at UE attachment when no routing to an AMF can be determined from the information provided by the UE; routing of User Plane data towards UPF(s); routing of Control Plane information towards AMF; connection setup and release; scheduling and transmission of paging messages (originated from the AMF); scheduling and transmission of system broadcast information (originated from the AMF or Operation and Maintenance); measurement and measurement reporting configuration for mobility and scheduling 129E; transport level packet marking in the uplink; session management; support of network slicing; QoS flow management and mapping to data radio bearers; support of UEs in RRC_INACTIVE state; distribution function for non-access stratum (NAS) messages; radio access network sharing; dual connectivity; and tight interworking between NR and E-UTRA, to name a few.

In some embodiments, the AMF 132 can be configured to host the following functions, for example: NAS signaling termination; NAS signaling security 133A; access stratum (AS) security control; inter-core network (CN) node signaling for mobility between 3GPP access networks; idle state/mode mobility handling 133B, including mobile device, such as a UE reachability (e.g., control and execution of paging retransmission); registration area management; support of intra-system and inter-system mobility; access authentication; access authorization including check of roaming rights; mobility management control (subscription and policies); support of network slicing; and/or SMF selection, among other functions.

The UPF 134 can be configured to host the following functions, for example: mobility anchoring 135A (e.g., anchor point for Intra-/Inter-RAT mobility); packet data unit (PDU) handling 135B (e.g., external PDU session point of interconnect to data network); packet routing and forwarding; packet inspection and user plane part of policy rule enforcement; traffic usage reporting; uplink classifier to support routing traffic flows to a data network; branching point to support multi-homed PDU session; QoS handling for user plane, e.g., packet filtering, gating, UL/DL rate enforcement; uplink traffic verification (SDF to QoS flow mapping); and/or downlink packet buffering and downlink data notification triggering, among other functions.

The Session Management function (SMF) 136 can be configured to host the following functions, for example: session management; UE IP address allocation and management 137A; selection and control of user plane function (UPF); PDU session control 137B, including configuring traffic steering at UPF 134 to route traffic to proper destination; control part of policy enforcement and QoS; and/or downlink data notification, among other functions.

Figure 1D:
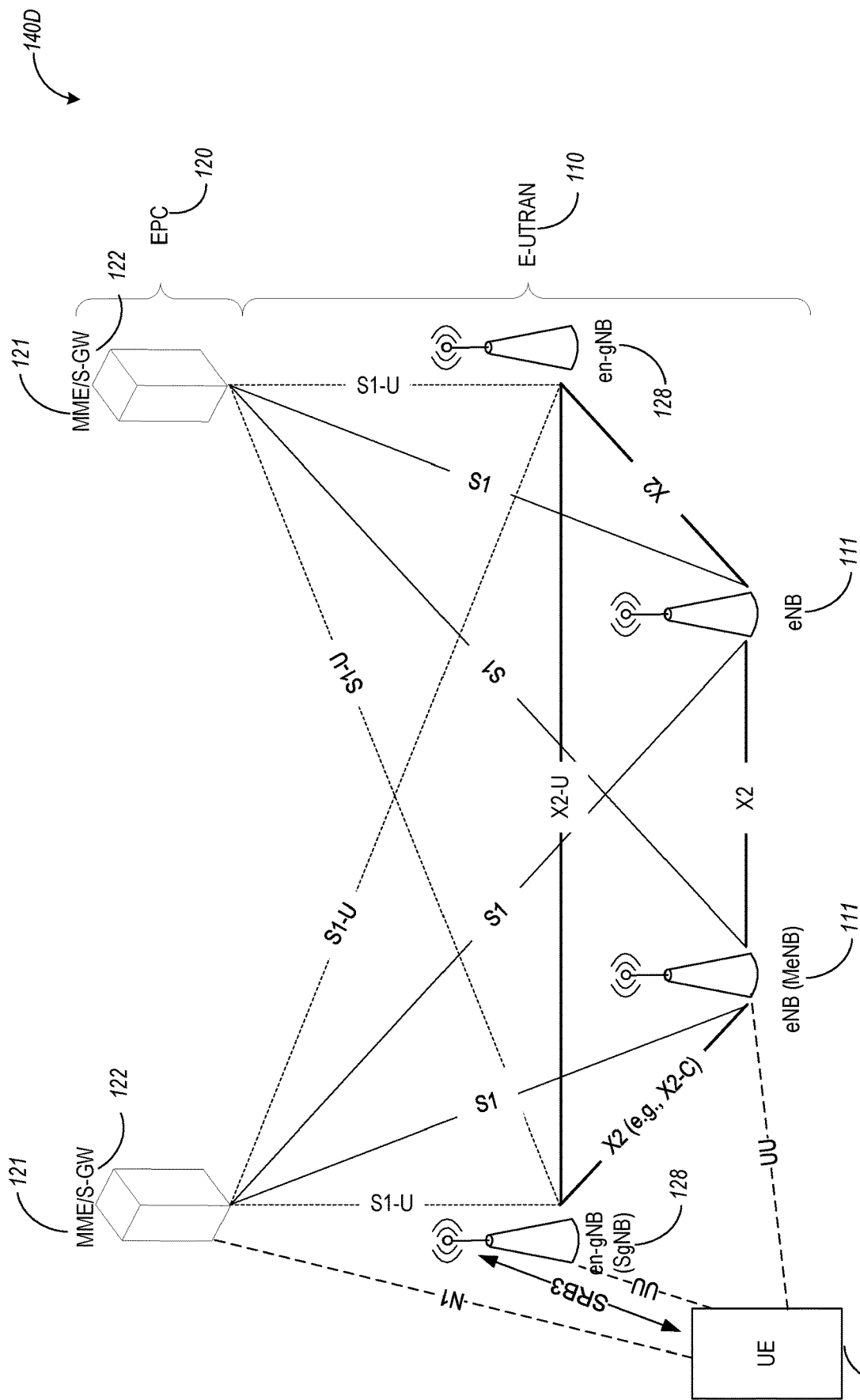
FIG. 1D illustrates an example Evolved Universal Terrestrial Radio Access (E-UTRA) New Radio Dual Connectivity (EN-DC) architecture, in accordance with some aspects.

FIG. 1D illustrates an example Evolved Universal Terrestrial Radio Access (E-UTRA) New Radio Dual Connectivity (EN-DC) architecture, in accordance with some aspects. Referring to FIG. 1D, the EN-DC architecture 140D includes radio access network (or E-TRA network, or E-TRAN) 110 and EPC 120. The EPC 120 can include MMES 121 and S-GWs 122. The E-UTRAN 110 can include nodes 111 (e.g., eNBs) as well as Evolved Universal Terrestrial Radio Access New Radio (EN) next generation evolved Node-Bs (en-gNBs) 128.

In some embodiments, en-gNBs 128 can be configured to provide NR user plane and control plane protocol terminations towards the UE 102 and acting as Secondary Nodes (or SgNBs) in the EN-DC communication architecture 140D. The eNBs 111 can be configured as master nodes (or MeNBs) and the eNBs 128 can be configured as secondary nodes (or SgNBs) in the EN-DC communication architecture 140D. As illustrated in FIG. 1D, the eNBs 111 are connected to the EPC 120 via the S1 interface and to the EN-gNBs 128 via the X2 interface. The EN-gNBs (or SgNBs) 128 may be connected to the EPC 120 via the S1-U interface, and to other EN-gNBs via the X2-U interface. The SgNB 128 can communicate with the UE 102 via a UU interface (e.g., using signaling radio bearer type 3, or SRB3 communications as illustrated in FIG. 1D), and with the MeNB 111 via an X2 interface (e.g., X2-C interface). The MeNB 111 can communicate with the UE 102 via a UU interface.

Even though FIG. 1D is described in connection with EN-DC communication environment, other types of dual connectivity communication architectures (e.g., when the UE 102 is connected to a master node and a secondary node) can also use the techniques disclosed herein.

In some embodiments, the MeNB 111 can be connected to the MME 121 via S1-MME interface and to the SgNB 128 via an X2-C interface. In some embodiments, the MeNB 111 can be connected to the SGW 122 via S1-U interface and to the SgNB 128 via an X2-U interface. In some aspects associated with dual connectivity (DC) and/or MultiRate-DC (MR-DC), the Master eNB (MeNB) can offload user plane traffic to the Secondary gNB (SgNB) via split bearer or SCG (Secondary Cell Group) split bearer.

Figure 2:
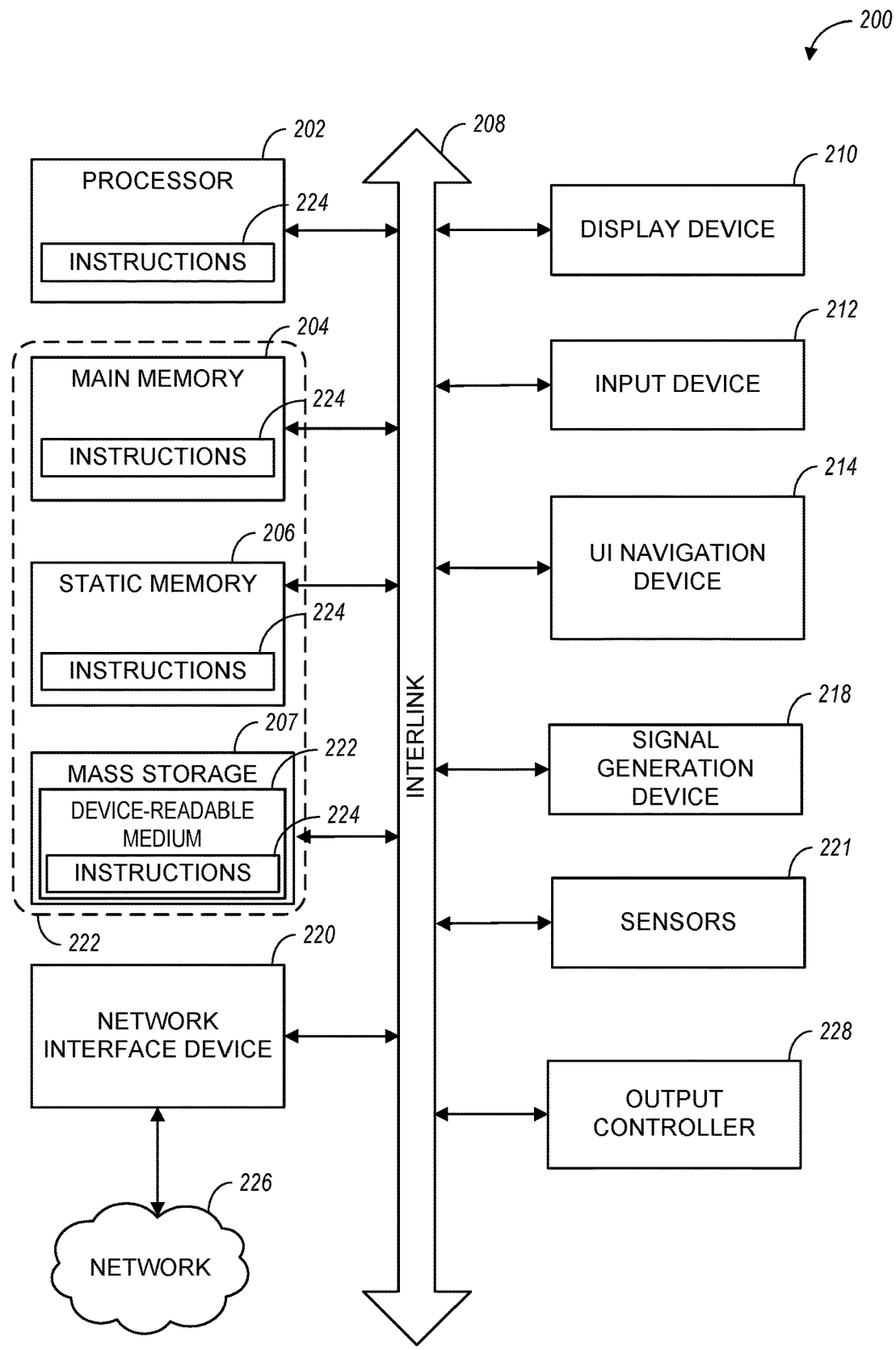
FIG. 2 illustrates a block diagram of a communication device such as an evolved Node-B (eNB), a new generation Node-B (gNB), an access point (AP), a wireless station (STA), a mobile station (MS), or a user equipment (UE), in accordance with some aspects.

FIG. 2 illustrates a block diagram of a communication device such as an evolved Node-B (eNB), a next generation Node-B (gNB), an access point (AP), a wireless station (STA), a mobile station (MS), or a user equipment (UE), in accordance with some aspects and to perform one or more of the techniques disclosed herein. In alternative aspects, the communication device 200 may operate as a standalone device or may be connected (e.g., networked) to other communication devices.

Circuitry (e.g., processing circuitry) is a collection of circuits implemented intangible entities of the device 200 that include hardware (e.g., simple circuits, gates, logic, etc.). Circuitry membership may be flexible over time. Circuitries include members that may, alone or in combination, perform specified operations when operating. In an example, the hardware of the circuitry may be immutably designed to carry out a specific operation (e.g., hardwired). In an example, the hardware of the circuitry may include variably connected physical components (e.g., execution units, transistors, simple circuits, etc.) including a machine-readable medium physically modified (e.g., magnetically, electrically, moveable placement of invariant massed particles, etc.) to encode instructions of the specific operation. In connecting the physical components, the underlying electrical properties of a hardware constituent are changed, for example, from an insulator to a conductor or vice versa. The instructions enable embedded hardware (e.g., the execution units or a loading mechanism) to create members of the circuitry in hardware via the variable connections to carry out portions of the specific operation when in operation. Accordingly, in an example, the machine-readable medium elements are part of the circuitry or are communicatively coupled to the other components of the circuitry when the device is operating. In an example, any of the physical components may be used in more than one member of more than one circuitry. For example, under operation, execution units may be used in a first circuit of a first circuitry at one point in time and reused by a second circuit in the first circuitry, or by a third circuit in a second circuitry at a different time. Additional examples of these components with respect to the device 200 follow.

In some embodiments, the device 200 may operate as a standalone device or may be connected (e.g., networked) to other devices. In a networked deployment, the communication device 200 may operate in the capacity of a server communication device, a client communication device, or both in server-client network environments. In an example, the communication device 200 may act as a peer communication device in peer-to-peer (P2P) (or other distributed) network environment. The communication device 200 may be a UE, eNB, PC, a tablet PC, a STB, a PDA, a mobile telephone, a smartphone, a web appliance, a network router, switch or bridge, or any communication device capable of executing instructions (sequential or otherwise) that specify actions to be taken by that communication device. Further, while only a single communication device is illustrated, the term "communication device" shall also be taken to include any collection of communication devices that individually or jointly execute a set (or multiple sets) of instructions to perform any one or more of the methodologies discussed herein, such as cloud computing, software as a service (SaaS), and other computer cluster configurations.

Examples, as described herein, may include, or may operate on, logic or a number of components, modules, or mechanisms. Modules are tangible entities (e.g., hardware) capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a communication device-readable medium. In an example, the software, when executed by the underlying hardware of the module, causes the hardware to perform the specified operations.

Accordingly, the term "module" is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software, the general-purpose hardware processor may be configured as respective different modules at different times. The software may accordingly configure a hardware processor, for example, to constitute a particular module at one instance of time and to constitute a different module at a different instance of time.

Communication device (e.g., UE) 200 may include a hardware processor 202 (e.g., a central processing unit (CPU), a graphics processing unit (GPU), a hardware processor core, or any combination thereof), a main memory 204, a static memory 206, and mass storage 207 (e.g., hard drive, tape drive, flash storage, or other block or storage devices), some or all of which may communicate with each other via an interlink (e.g., bus) 208.

The communication device 200 may further include a display device 210, an alphanumeric input device 212 (e.g., a keyboard), and a user interface (UI) navigation device 214 (e.g., a mouse). In an example, the display device 210, input device 212 and UI navigation device 214 may be a touch-screen display. The communication device 200 may additionally include a signal generation device 218 (e.g., a speaker), a network interface device 220, and one or more sensors 221, such as a global positioning system (GPS) sensor, compass, accelerometer, or another sensor. The communication device 200 may include an output controller 228, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 207 may include a communication device-readable medium 222, on which is stored one or more sets of data structures or instructions 224 (e.g., software) embodying or utilized by any one or more of the techniques or functions described herein. In some embodiments, registers of the processor 202, the main memory 204, the static memory 206, and/or the mass storage 207 may be, or include (completely or at least partially), the device-readable medium 222, on which is stored the one or more sets of data structures or instructions 224, embodying or utilized by any one or more of the techniques or functions described herein. In an example, one or any combination of the hardware processor 202, the main memory 204, the static memory 206, or the mass storage 216 may constitute the device-readable medium 222.

As used herein, the term "device-readable medium" is interchangeable with "computer-readable medium" or "machine-readable medium". While the communication device-readable medium 222 is illustrated as a single medium, the term "communication device-readable medium" may include a single medium or multiple media (e.g., a centralized or distributed database, and/or associated caches and servers) configured to store the one or more instructions 224.

The term "communication device-readable medium" may include any medium that is capable of storing, encoding, or carrying instructions (e.g., instructions 224) for execution by the communication device 200 and that cause the communication device 200 to perform any one or more of the techniques of the present disclosure, or that is capable of storing, encoding or carrying data structures used by or associated with such instructions. Non-limiting communication device-readable medium examples may include solid-state memories and optical and magnetic media. Specific examples of communication device-readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; Random Access Memory (RAM); and CD-ROM and DVD-ROM disks. In some examples, communication device-readable media may include non-transitory communication device-readable media. In some examples, communication device-readable media may include communication device-readable media that is not a transitory propagating signal.

The instructions 224 may further be transmitted or received over a communications network 226 using a transmission medium via the network interface device 220 utilizing any one of a number of transfer protocols. In an example, the network interface device 220 may include one or more physical jacks (e.g., Ethernet, coaxial, or phone jacks) or one or more antennas to connect to the communications network 226. In an example, the network interface device 220 may include a plurality of antennas to wirelessly communicate using at least one of single-input-multiple-output (SIMO), MIMO, or multiple-input-single-output (MISO) techniques. In some examples, the network interface device 220 may wirelessly communicate using Multiple User MIMO techniques.

The term "transmission medium" shall be taken to include any intangible medium that is capable of storing, encoding or carrying instructions for execution by the communication device 200, and includes digital or analog communications signals or another intangible medium to facilitate communication of such software. In this regard, a transmission medium in the context of this disclosure is a device-readable medium.

Figure 3:
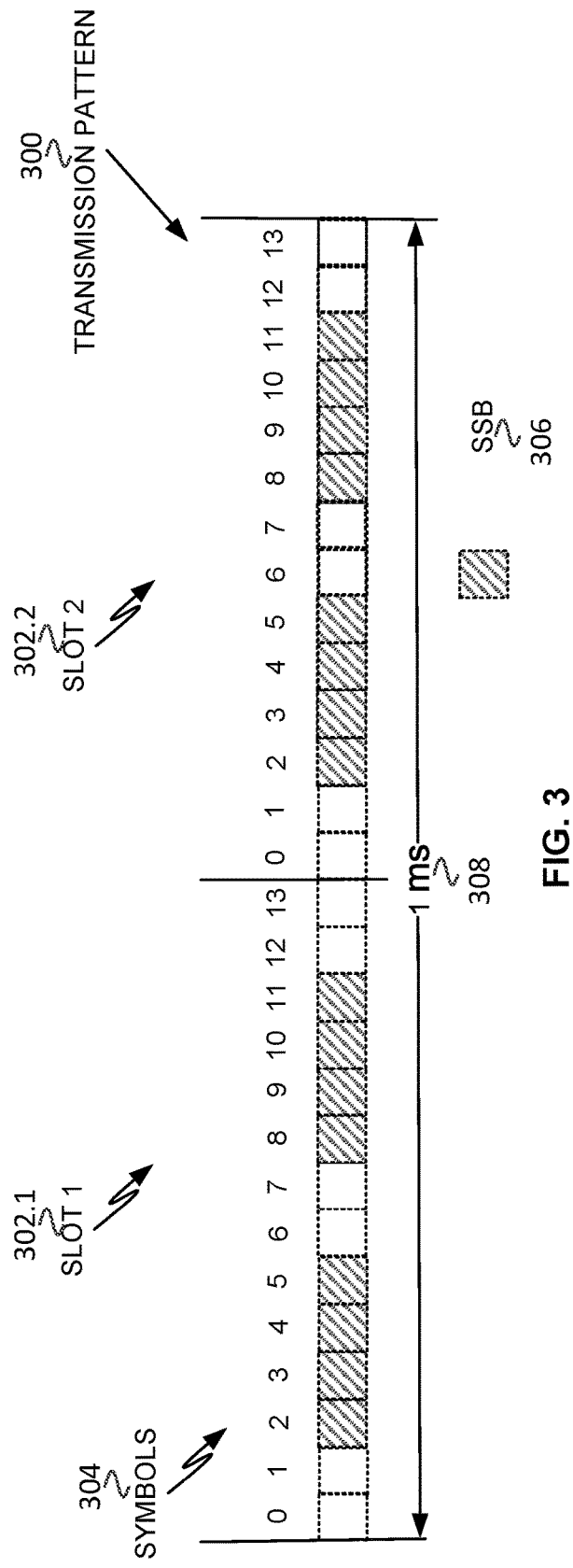
FIG. 3 illustrates a transmission pattern, in accordance with some embodiments.

FIG. 3 illustrates a transmission pattern 300, in accordance with some embodiments. Illustrated in FIG. 3 is slot 1 302.1, slot 2 302.2, symbols 304, synchronization signal block (SSB) 306, and 1 ms 308. Each slot 302 includes 14 symbols 304, e.g., 0 through 13. The slots 302 are each ½ of 1 ms 308 in duration. The SSBs are four (4) symbols 304 in duration. The SSBs 306 are transmitted on the and physical broadcast channel (PBCH). In some embodiments, the SSBs 306 are transmitted in a predetermined pattern. In some embodiments, SSBs 306 are transmitted using the following groups of symbols 304: symbols 2, 3, 4, and 5 of slot 1 302.1; symbols 8, 9, 10, and 11 of slot 1 302.1; symbols 2, 3, 4, and 5 of slot 2 302.2; and, symbols 8, 9, 10, and 11 of slot 2 302.2. Different symbols 304 may be used.

Figure 4:
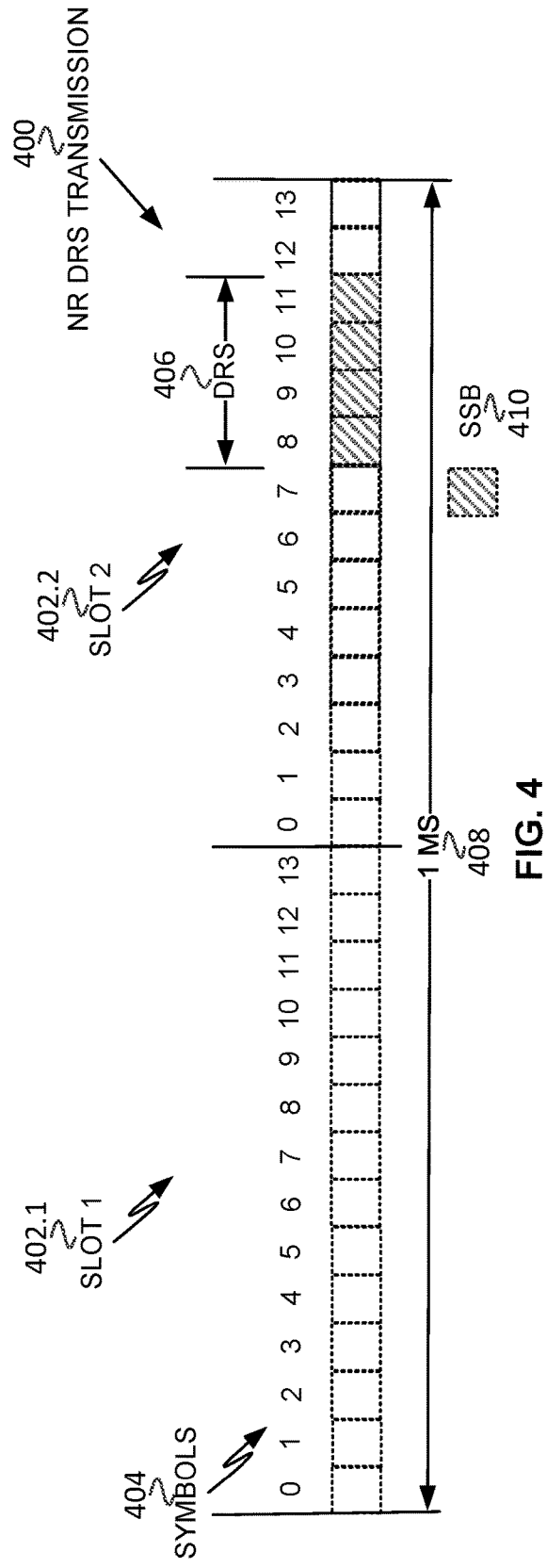
FIG. 4 illustrates an example of a NR Discovery Reference Signal (DRS) transmission 400, in accordance with some embodiments.

FIG. 4 illustrates an example of a NR Discovery Reference Signal (DRS) transmission 400, in accordance with some embodiments. Illustrated in FIG. 4 is slot 1 402.1, slot 2 402.2, symbols 404, DRS 406, one (1) MS 408, and SSB 410. The slots 402 are each ½ of 1 ms 408 in duration. Each slot 402 includes 14 symbols 404, e.g., 0 through 13. The SSB 410 is transmitted on DRS during symbols 8, 9, 10, and 11 of slot 2 402.2. Different symbols 404 may be used.

Figure 5:
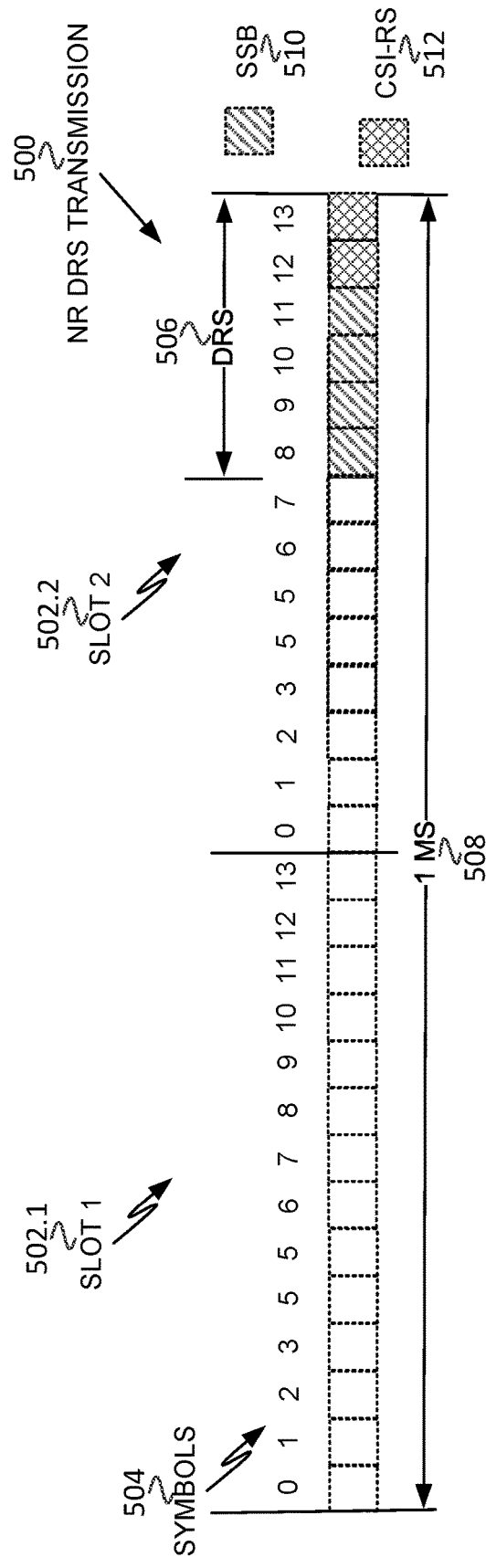
FIG. 5 illustrates a NR DRS transmission, in accordance with some embodiments.

FIG. 5 illustrates a NR DRS transmission 500, in accordance with some embodiments. Illustrated in FIG. 5 is slot 1 502.1, slot 2 502.2, symbols 504, DRS 506, one (1) MS 508, SSB 510, and channel state information (CSI)-reference signal (RS)(CSI-RS) 512. The slots 502 are each ½ of one (1) ms 508 in duration. The SSB 510 and CSI-RS 512 are transmitted using the DRS 506 during symbols 8 through 13 of slot 2 502.2 with the SSB 510 being transmitted during symbols 504 8, 9, 10, and 11 of slot 2 502.2, and the CSI-RS 512 being transmitted during symbols 12 and 13 of slot 2 502.2. Different symbols 504 may be used. In some embodiments, the SSB 510 may be transmitted using the PBCH.

Figure 6:
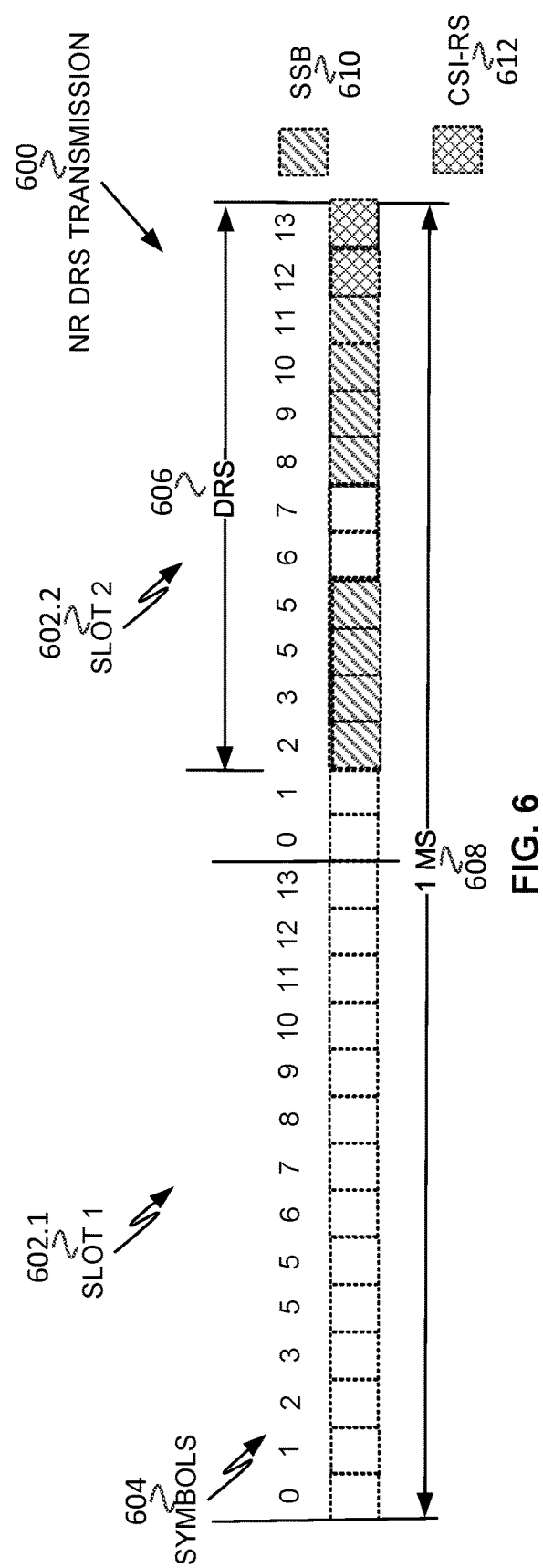
FIG. 6 illustrates a NR DRS transmission, in accordance with some embodiments.

FIG. 6 illustrates a NR DRS transmission 600, in accordance with some embodiments. Illustrated in FIG. 6 is slot 1 602.1, slot 2 602.2, symbols 604, DRS 606, one (1) MS 608, SSB 610, and CSI-RS 612. The slots 602 are each ½ of one (1) ms 608 in duration. The SSB 610 and CSI-RS 612 are transmitted using the DRS 606 during symbols 604 2 through 5 and 8 through 13 of slot 2 602.2. The SSBs 610 are transmitted on symbols 604 2-5 and symbols 8-11 of slot 2 602.2. The CSI-RS 612 is transmitted during symbols 604 12 and 13. Different symbols 604 may be used. In some embodiments, the SSB 610 may be transmitted using the PBCH.

Referring to FIGS. 3-6, in some embodiments a maximum time duration of a transmission 300, 400, 500, 600, depends on a maximum channel occupancy time (MCOT) that may be predetermined or part of a configuration of a standard, e.g., NR. The SSB 306, 406, 506, and 606 may be a NR Rel-15 SSB+PBCH structure that has a time duration of 4 symbols. A minimum time duration of a NR DRS (e.g., 406, 506, 606) may be a fraction of a slot 402, 502, 602, and a maximum time duration may be limited by MCOT.

Prior to the transmission of the NR DRS (e.g., 406, 506, 606), a listen before talk (LBT) may have to be performed by a network (NW), UE and/or eNB (e.g., 111, 128, 130) prior to transmitting the NR DRS. A NW may be a eNB or another NW device that transmits to a UE. The LBT requires a duration, e.g., 5 ms. NR DRS may be opportunistically transmitted based on when LBT indicates the channel is free. The time duration for LBT may vary. The duration of the DRS transmission 400, 500, 600, may be a different duration than illustrated. FIG. 3 is based on a subcarrier frequency spacing of 30 kHz.

In some embodiments, each slot is 14 Orthogonal Frequency Division Multiplexing (OFDM) symbols with each OFDM symbols including 12 subcarriers. Tables 1-5 are illustrated below. In NR Rel-15, each slot can support a maximum of 2 SSB transmission opportunities, in accordance with some embodiments. Only certain slots are allowed to transmit SSBs. Sixty-four codepoints are used to indicate a SSB index with six bits used to indicate the sixty-four codepoints. Three bits are encoded using the PBCH-DeModulation Reference Signal (DMRS). Three bits are encoded using the master information block (MIB). In some embodiments, a designated location within a designated slot is associated with a particular unique SSB index, which allows the slot/frame timing information to be discovered from the SSB index.

In some embodiments, LBT may indicate that a transmission may not be performed, which may make it harder for the NW to transmit SSB indexes. In some embodiments, all the slots within a certain time window (e.g., 5 ms) may be used as SSB transmissions opportunities. In some embodiments, SSB indices and slot and symbol timing information is conveyed (or encoded) jointly. For example, SSB indices and slot and symbol timing information is sent using the PBCH-DMRS sequence and PBCH payload.

In some embodiments, a slot and symbol location is not associated with a pre-determined SSB index, but rather the NW may chose to schedule a SSB index in a slot and symbol location. In some embodiments, different sets of SSB indexes are available to the NW to schedule for a given slot and symbol location, which may be deemed a transmission opportunity. For example, Table 1 permits the NW to schedule any of the SSB indexes in a transmission opportunity and Tables 2-5 permit the NW to schedule some subset of the SSB indexes in a transmission opportunity. Permitting the NW to select from all or a subset of the SSB indexes to schedule during a transmission opportunity, may enable the NW control the frequency of the different SSB indexes that are transmitted post-LBT over a longer term. A technical problem of scheduling SSB indexes with LBT may be solved as disclosed herein and in particular in conjunction with Tables 1-5.

TABLE 1

Association of SSB index with SSB transmission opportunity

| | Slot | | | | | | | | | |
|---|---|---|---|---|---|---|---|---|---|---|
| | 1 | | 2 | | 3 | | 4 | | 5 | |
| Transmission opportunity | 0 | 1 | 2 | 3 | 4 | 5 | 6 | 7 | 8 | 9 |
| SSB index | 0 | 0 | 0 | 0 | 0 | 0 | 0 | 0 | 0 | 0 |
| | 1 | 1 | 1 | 1 | 1 | 1 | 1 | 1 | 1 | 1 |
| | 2 | 2 | 2 | 2 | 2 | 2 | 2 | 2 | 2 | 2 |
| | 3 | 3 | 3 | 3 | 3 | 3 | 3 | 3 | 3 | 3 |
| Number of code points | 4 | 4 | 4 | 4 | 4 | 4 | 4 | 4 | 4 | 4 |
| Total codepoints (bits required) | 40 (6 bits) | | | | | | | | | |
| Subcarrier frequency spacing | 15 kHz | | | | | | | | | |
| Number of Beams (L) | 4 | | | | | | | | | |

Table 1 illustrates an association of SSB indexes with SSB transmission opportunities. As illustrated there are five (5) slots, and two (2) SSB transmission opportunities are available per slot, in accordance with some embodiments. A transmission opportunity are symbols within the slot where a SSB may be transmitted, e.g., symbols 604 2, 3, 4, and 5 (FIG. 6) of slot 2 602.2. There are two (2) transmission opportunities per slot. SSB index indicates an SSB index that may be transmitted during the transmission opportunity, e.g., SSB index 0, 1, 2, or 3 may be transmitted in each of the transmission opportunities 0 through 9. Number of codepoints indicates a number of points that are encoded, e.g., whether each of SSB index is transmitted during a transmission opportunity. Total codepoints is the total number of codepoints for the transmission opportunities, i.e., which SSB index is transmitted on each transmission opportunity. Subcarrier frequency spacing 15 kHz indicates the assumption for the subcarrier frequency spacing. Number of beams (L) indicates the assumption for the number of beams. NW can schedule transmissions of the different SSB indexes that post-LBT all the SSB indexes are transmitted with approximately equal frequency over an extended period of time. This may enable better radio resource management (RRM) measurements related to cell quality where a UE may determine cell quality by linear averaging of measurements from up to N best beams above a certain threshold.

TABLE 2

Association of SSB index with SSB transmission opportunity

| | Slot | | | | | | | | | |
|---|---|---|---|---|---|---|---|---|---|---|
| | 1 | | 2 | | 3 | | 4 | | 5 | |
| Transmission opportunity | 0 | 1 | 2 | 3 | 4 | 5 | 6 | 7 | 8 | 9 |
| SSB index | 0 | 1 | 2 | 3 | 0 | 0 | 0 | 0 | 0 | 0 |
| | | | | | 1 | 1 | 1 | 1 | 1 | 1 |
| | | | | | 2 | 2 | 2 | 2 | 2 | 2 |
| | | | | | 3 | 3 | 3 | 3 | 3 | 3 |
| Number of code-points | 1 | 1 | 1 | 1 | 4 | 4 | 4 | 4 | 4 | 4 |
| Total codepoints | 28 (5 bits) | | | | | | | | | |
| Subcarrier frequency spacing | 15 kHz | | | | | | | | | |
| Number of Beams (L) | 4 | | | | | | | | | |

Table 2 illustrates association of SSB index with SSB transmission opportunity, in accordance with some embodiments. Table 2 illustrates subsets of SSB indexes that are available to use for different transmission opportunities. In some embodiments, transmission opportunities 0-3 are each associated with one SSB index, and then the other transmission opportunities permit any of the SSB indexes to be selected. In some embodiments, the transmission opportunities that allow a single SSB index may be different (e.g., 0, 2, 4, 6, 8). Five (5) bits may be needed to encode the codepoints of Table 2.

TABLE 3

Association of SSB index with SSB transmission opportunity

| | Slot | | | | | | | | | |
|---|---|---|---|---|---|---|---|---|---|---|
| | 1 | | 2 | | 3 | | 4 | | 5 | |
| Transmission opportunity | 0 | 1 | 2 | 3 | 4 | 5 | 6 | 7 | 8 | 9 |
| SSB index | 0 | 6 | 4 | 2 | 0 | 6 | 4 | 2 | 0 | 6 |
| | 1 | 7 | 5 | 3 | 1 | 7 | 5 | 3 | 1 | 7 |
| | 2 | 0 | 6 | 4 | 2 | 0 | 6 | 4 | 2 | 0 |
| | 3 | 1 | 7 | 5 | 3 | 1 | 7 | 5 | 3 | 1 |
| | 4 | 2 | 0 | 6 | 4 | 2 | 0 | 6 | 4 | 2 |
| | 5 | 3 | 1 | 7 | 5 | 3 | 1 | 7 | 5 | 3 |
| | 6 | | | | 7 | 5 | | | | 4 |
| Number of code-points | 7 | 6 | 6 | 6 | 7 | 7 | 6 | 6 | 6 | 7 |
| Total codepoints | 64 (6 bits) | | | | | | | | | |
| Subcarrier frequency spacing | 15 kHz | | | | | | | | | |
| Number of Beams (L) | 8 | | | | | | | | | |

Table 3 illustrates an association of SSB index with SSB transmission opportunity. In Table 3, the number of codepoints is kept at 64 (6 bits). The SSB indexes are each available in eight (8) out of the ten (10) transmission opportunities. Different subsets can be selected to provide the even distribution of the SSB indexes (i.e., a same number for each SSB index).

TABLE 4

Association of SSB index with SSB transmission opportunity

| Slot | 1 | | 2 | | 3 | | 4 | | 5 | | 6 | | 7 | | 8 | | 9 | | 10 | |
|---|---|---|---|---|---|---|---|---|---|---|---|---|---|---|---|---|---|---|---|---|
| Transmission opportunity | 0 | 1 | 2 | 3 | 4 | 5 | 6 | 7 | 8 | 9 | 10 | 11 | 12 | 13 | 14 | 15 | 16 | 17 | 18 | 19 |
| SSB index | 0 | 1 | 2 | 3 | 0 | 1 | 2 | 3 | 0 | 1 | 2 | 3 | 0 | 1 | 2 | 3 | 0 | 1 | 2 | 3 |
| | 3 | 0 | 1 | 2 | 3 | 0 | 1 | 2 | 3 | 0 | 1 | 2 | 3 | 0 | 1 | 2 | 3 | 0 | 1 | 2 |
| | 2 | 3 | 0 | 1 | 2 | 3 | 0 | 1 | 2 | 3 | 0 | 1 | 2 | 3 | 0 | 1 | 2 | 3 | 0 | 1 |
| | | | | 0 | | | | | 1 | | | | | 2 | | | | | 3 | |
| Number of code-points | 3 | 3 | 3 | 4 | 3 | 3 | 3 | 3 | 4 | 3 | 3 | 3 | 3 | 4 | 3 | 3 | 3 | 3 | 4 | 3 |

| | |
|---|---|
| Total code-points | 64 (6 bits) |
| Sub-carrier frequency spacing | 30 kHz |
| Number of Beams (L) | 4 |

Table 4 illustrates association of SSB index with SSB transmission opportunity, in accordance with some embodiments. Table 4 has 64 total codepoints that may be represented with 6 bits. SSB indexes 0-3 are each assigned a same number of the transmission opportunities, i.e., sixteen (16) out of twenty (20).

TABLE 5

Association of SSB index with SSB transmission opportunity

| Slot | 1 | | 2 | | 3 | | 4 | | 5 | | 6 | | 7 | | 8 | | 9 | | 10 | |
|---|---|---|---|---|---|---|---|---|---|---|---|---|---|---|---|---|---|---|---|---|
| Transmission opportunity | 0 | 1 | 2 | 3 | 4 | 5 | 6 | 7 | 8 | 9 | 10 | 11 | 12 | 13 | 14 | 15 | 16 | 17 | 18 | 19 |
| SSB index | 0 | 3 | 6 | 1 | 4 | 7 | 2 | 5 | 0 | 3 | 6 | 1 | 4 | 7 | 2 | 5 | 0 | 3 | 6 | 1 |
| | 1 | 4 | 7 | 2 | 5 | 0 | 3 | 6 | 1 | 4 | 7 | 2 | 5 | 0 | 3 | 6 | 1 | 4 | 7 | 2 |
| | 2 | 5 | 0 | 3 | 6 | 1 | 4 | 7 | 2 | 5 | 0 | 3 | 6 | 1 | 4 | 7 | 2 | 5 | 0 | 3 |
| | | | | | 7 | | | | | 6 | | | | | 5 | | | | | 4 |
| Number of code-points | 3 | 3 | 3 | 3 | 4 | 3 | 3 | 3 | 3 | 4 | 3 | 3 | 3 | 3 | 4 | 3 | 3 | 3 | 3 | 4 |

| | |
|---|---|
| Total code-points | 64 (6 bits) |
| Sub-carrier frequency spacing | 30 kHz |
| Number of Beams (L) | 8 |

Table 5 illustrates association of SSB index with SSB transmission opportunity, in accordance with some embodiments. Table 5 has 64 total codepoints that may be represented with 6 bits. SSB indexes 0-7 are each assigned a same number of the transmission opportunities, i.e., eight (8) out of twenty (20). Different assignments of the SSB indexes may be used that result in a same number of transmission opportunities for each of the SSB indexes.

In some embodiments, if a number of codepoints is limited to 64, then to offer the flexibility to the NW of transmitting any SSB index in any transmission opportunity a maximum of 6 beams (L=6) can be supported with 15 kHz subcarrier frequency spacing and a maximum of 3 beam (L=3) can be supported for 30 kHz. In some embodiments, in unlicensed operation (e.g., 2.5 GHz, 5 GHz, 6 GHz, and/or 60 GHz), equivalent isotropically radiated power (EIRP) and/or power spectrum density (PSD) limitations may limit the benefit of narrow beams, which may limit the number of beams. In some embodiments, a number of bits assigned to indicate SSB index and frame-timing (e.g., slot and symbol) may be increased in PBCH.

Figure 8:
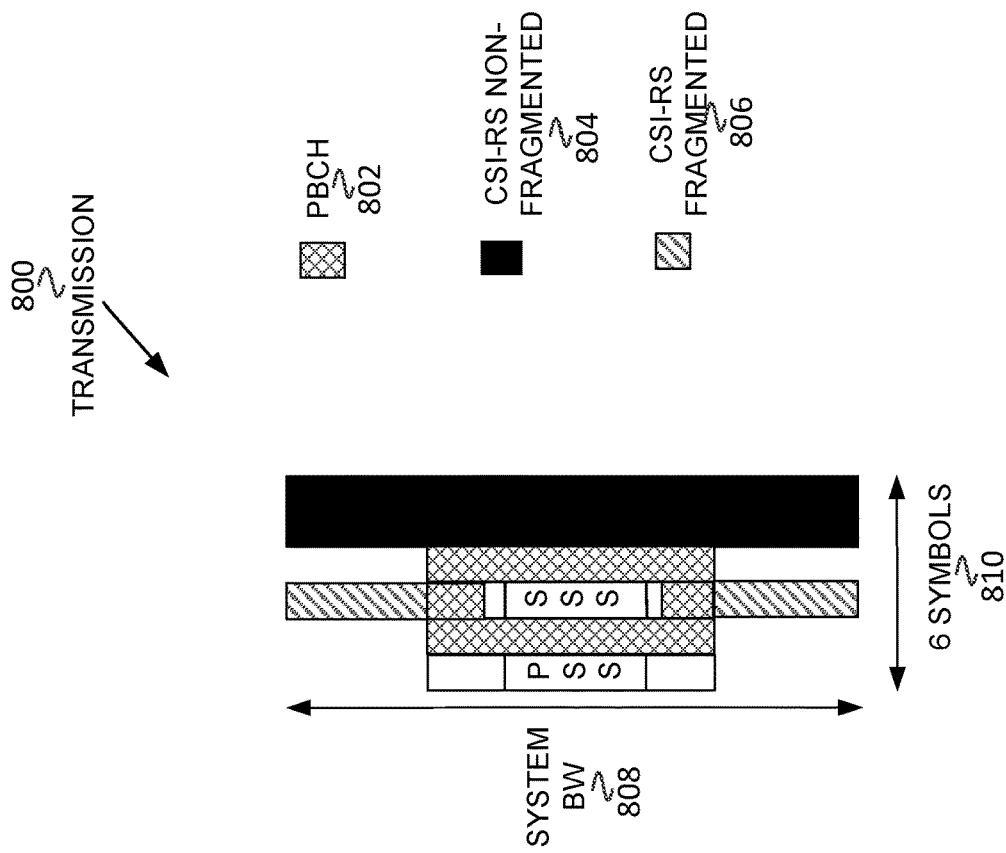
FIG. 8 illustrates a for channel state information reference signal (CSI-RS) transmission as part of DRS, in accordance with some embodiments.
Figure 7:
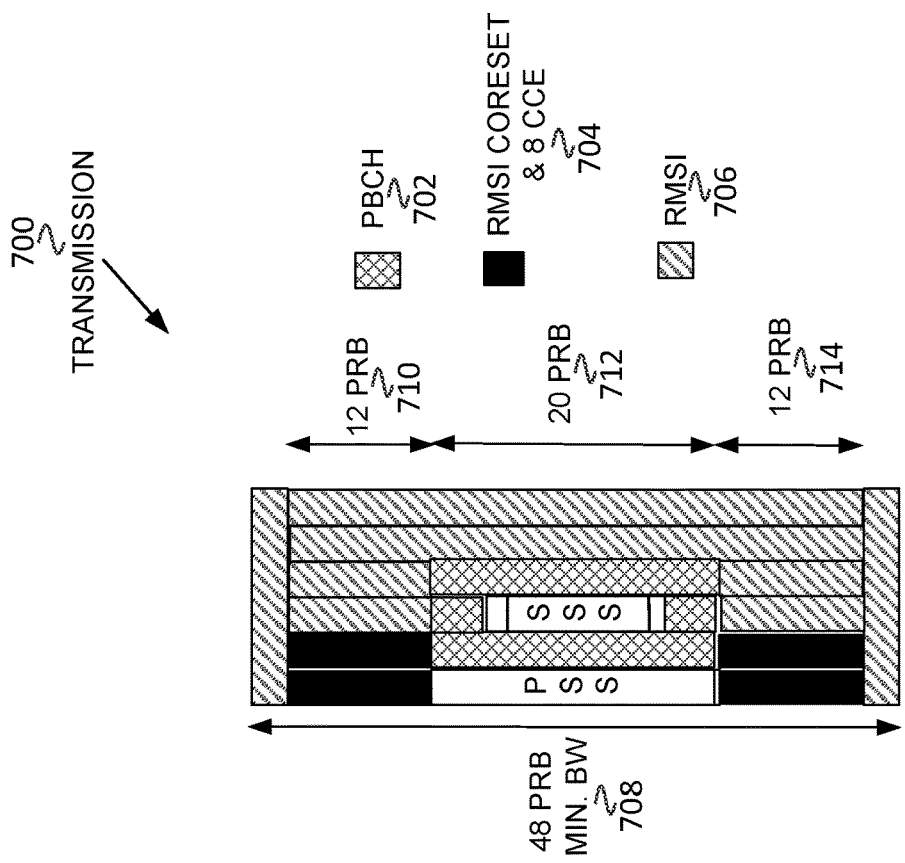
FIG. 7 illustrates a remaining minimum system information (RMSI) Coreset and RMSI transmission as part of DRS, in accordance with some embodiments.

FIGS. 7 and 8 are disclosed in conjunction with one another. FIG. 7 illustrates a remaining minimum system information (RMSI) Coreset and RMSI transmission 700 as part of DRS, in accordance with some embodiments. Illustrated in FIG. 7 is PBCH 702, RMSI Coreset & eight (8) CCE 704, RMSI 706, 48 PRB min bandwidth (BW) 708, 12 PRB 710, 20 PRB 712, 12 PRB 714, primary synchronization signal (PSS), and secondary synchronization signal (SSS). FIG. 8 illustrates a for channel state information reference signal (CSI-RS) transmission 800 as part of DRS, in accordance with some embodiments. Illustrated in FIG. 8 is PBCH 802, CSI-RS non-fragmented 804, CSI-RS fragmented 806, system BW 808, six (6) symbols 810, PSS, and SSS.

CSI-RS non-fragmented 804 and/or CSI-RS fragmented is permitted as part of the DRS transmission 800, in accordance with some embodiments. In some embodiments, the NW may determine whether to permit CSI-RS non-fragmented 804 and/or CSI-RS fragmented as part of DRS transmission 800. CSI-RS non-fragmented 804 and/or CSI-RS fragmented may reduce LBT overhead. CSI-RS non-fragmented 804 and/or CSI-RS fragmented 806 may enable RRM measurements as they may permit the transmission of the CSI-RS non-fragmented 804 and/or CSI-RS fragmented 806.

In some embodiments, CSI-RS non-fragmented 804 and/or CSI-RS fragmented 806 are transmitted in the symbols 810 following a SSB, e.g., one or more CSI-RS non-fragmented 804 may be transmitted after an SSB is transmitted on the PBCH 802.

In some embodiments, one or more CSI-RS non-fragmented 804 and/or CSI-RS fragmented 806 are configured to a UE 101, 102 and associated with a SSB index (not necessarily QCL). CSI-RS fragmented 806 may be fragmented in the frequency-domain due to SSB is also proposed. For example, as illustrated in FIG. 8, the CSI-RS fragmented 806 is transmitted above and below the PBCH 802 where a SSB is transmitted.

Higher layers may signal whether a CSI-RS is fragmented on not, in accordance with some embodiments. A CSI-RS resource is associated with a resource type (fragmented or non-fragmented), in accordance with some embodiments. It is also possible that a CSI-RS resource when transmitted on the same symbols as SSB (e.g., as illustrated on $3^{rd}$ symbol of 6 symbols 810) is fragmented but otherwise non-fragmented. In this case, a UE 101. 102 implicitly determines whether a particular instance of CSI-RS is fragmented or not.

In some embodiments, within a symbol the NW transmits over the frequency domain two fragmented portions of the CSI-RS and the legacy content of the SSB for that symbol. In some embodiments, the SSB comprises multiple channels: SSS/PSS and PBCH, and depending on the specific symbol of the SSB, one or more of the channels may be transmitted. In some embodiments, the NW transmits SSS+PBCH during the symbol where CSI-RS is also transmitted.

Example 1 includes subject matter (such as an apparatus, a method, a means for performing acts, or a machine readable medium including instructions that, when performed by the machine, that cause the machine to perform acts), comprising: an apparatus of a user equipment (UE), the apparatus including: processing circuitry, memory coupled to the processing circuitry, wherein the processing circuitry is configured to: decode a new radio (NR) Discovery Reference Signal (DRS) transmission, the NR DRS transmission comprising a synchronization signal block (SSB) and channel state information (CSI) reference signal (RS) (CSI-RS); and configure the UE to determine channel state based on the CSI-RS.

In Example 2, the subject matter of Example 1 may optionally include, where the RS-CSI is a fragmented RS-CSI comprising a first fragmented portion and a second fragmented portion, and where encode further comprises: encode a symbol of the NR DRS transmission to comprise the first fragmented portion, a symbol of the SSB, and the second fragmented portion, wherein the symbol of the SSB is encoded on a physical broadcast channel (PBCH) portion of the NR DRS transmission.

In Example 3, the subject matter of Example 1 or 2 may optionally include, wherein encode further comprises: encode the NR DRS transmission to comprise 14 symbols, wherein the SSB is encoded on four (4) symbols of the 14 symbols and the CSI-RS is encoded on a different 2 symbols of the 14 symbols.

In Example 4, the subject matter of Examples 1-3 may optionally include, where encode further comprises: encode the CSI-RS across a system bandwidth of the NR DRS transmission, and encode the SSB using the physical broadcast channel (PBCH) portion of the NR DRS transmission.

Although an aspect has been described with reference to specific exemplary aspects, it will be evident that various modifications and changes may be made to these aspects without departing from the broader scope of the present disclosure. Accordingly, the specification and drawings are to be regarded in an illustrative rather than a restrictive sense. This Detailed Description, therefore, is not to be taken in a limiting sense, and the scope of various aspects is defined only by the appended claims, along with the full range of equivalents to which such claims are entitled.

What is claimed is:

1. An apparatus comprising:
one or more processors, wherein the one or more processors are configured to cause a network (NW) to:
encode a new radio (NR) Discovery Reference Signal (DRS) transmission, the NR DRS transmission comprising a synchronization signal block (SSB), remaining minimum system information (RMSI) control resource set (CORESET), and RMSI, mapping to 48 physical resource block (PRBs), wherein the SSB includes a physical broadcast channel (PBCH), primary synchronization signal (PSS), and secondary synchronization signal (SSS); and
configure the NW to transmit the NR DRS transmission.

2. The apparatus of claim 1, wherein the RMSI CORESET is associated with one or more search space sets for physical control channels.

3. The apparatus of claim 1, wherein the RMSI comprises a RMSI physical downlink shared channel (PDSCH) that is rate-matched around the RMSI CORESET.

4. The apparatus of claim 1, wherein the NR DRS transmission further comprises a channel state information (CSI) reference signal (RS) (CSI-RS), wherein the CSI-RS is a fragmented CSI-RS comprising a first fragmented portion and a second fragmented portion, and wherein said encoding further comprises:
encoding within a symbol duration of the NR DRS transmission the first fragmented portion, a symbol of the SSB, and the second fragmented portion, wherein the symbol of the SSB is encoded on the PBCH of the NR DRS transmission.

5. The apparatus of claim 1, wherein said encoding further comprises:
encoding the NR DRS transmission to comprise 14 symbols, wherein the SSB is encoded on four (4) symbols of the 14 symbols and a channel state information (CSI) reference signal (RS) (CSI-RS) is encoded on a different 2 symbols of the 14 symbols.

6. The apparatus of claim 5, wherein said encoding further comprises:
encoding the CSI-RS across a system bandwidth of the NR DRS transmission, and encode the SSB using the PBCH of the NR DRS transmission.

7. The apparatus of claim 5, wherein the SSB is a first SSB and the four symbols is a first four symbols, and wherein said encoding further comprises:
encoding the NR DRS transmission to further comprise a second SSB encoded on a second four symbols, the second four symbols different from the first four symbols.

8. The apparatus of claim 1, wherein the NR DRS transmission further comprises a channel state information (CSI) reference signal (RS) (CSI-RS), wherein said encoding further comprises:
encoding the NR DRS transmission to comprise 6 symbols, wherein the SSB is encoded on four (4) symbols of the 6 symbols and the CSI-RS is encoded on a different 2 symbols of the 6 symbols.

9. The apparatus of claim 1, wherein the SSB is associated with an SSB index, and wherein the NR DRS transmission comprises slots, each slot of the slots comprising 14 symbols, the 14 symbols comprising a first transmission opportunity of a first 4 symbols and a second transmission opportunity of a second 4 symbols, wherein one or more first SSB indexes is permitted for the first transmission opportunity and one or more second SSB indexes is permitted for the second transmission opportunity, and wherein the SSB index is one of the one or more first SSB indexes or the SSB index is one of the one or more second SSB indexes.

10. The apparatus of claim 9, wherein the NR DRS transmission comprises 5 or 10 slots and the NW is configured with 4 beams (L) or 8 L and to transmit with a subcarrier frequency spacing of 15 kHz or 30 kHz.

11. The apparatus of claim 10, wherein each beam is associated with a SSB index and each transmission opportunity is associated with one or more SSB indexes that are permitted to be transmitted during the transmission opportunity.

12. The apparatus of claim 11, wherein each SSB index is permitted to be transmitted on an equal number of transmission opportunities.

13. The apparatus of claim 10, wherein at most one (1) channel state information (CSI) reference signal (RS) (CSI-RS) CSI RS is transmitted per slot.

14. The apparatus of claim 1, wherein the one or more processors are further configured to:
perform a listen before talk (LBT) procedure before transmission.

15. The apparatus of claim 1, wherein the NR DRS transmission comprises slots, and wherein each slot of the slots comprises 14 symbols, and wherein at most 2 SSBs are transmitted in each slot.

16. The apparatus of claim 1, wherein the NW is an evolved Node-B (eNB) or a new generation Node-B (gNB).

17. A non-transitory computer-readable storage medium that stores instructions for execution by one or more processors of a user equipment (UE), the instructions to configure the one or more processors to cause the UE to:
encode a new radio (NR) Discovery Reference Signal (DRS) transmission, the NR DRS transmission comprising a synchronization signal block (SSB), remaining minimum system information (RMSI) control resource set (CORESET), and RMSI, mapping to 48 physical resource block (PRBs), wherein the SSB includes a physical broadcast channel (PBCH), primary synchronization signal (PSS), and secondary synchronization signal (SSS); and
transmit the NR DRS transmission.

18. The non-transitory computer-readable storage medium of claim 17, wherein the NR DRS transmission further comprises a channel state information (CSI) reference signal (RS) (CSI-RS), wherein the CSI-RS is a fragmented CSI-RS comprising a first fragmented portion and a second fragmented portion, and wherein encode further comprises:
encode within a symbol duration of a frequency bandwidth of the NR DRS transmission the first fragmented portion, a symbol of the SSB, and the second fragmented portion, wherein the symbol of the SSB is encoded at least partially the PBCH of the NR DRS transmission.

19. An apparatus comprising:
one or more processors, wherein the one or more processors are configured to cause a user equipment (UE) to:
decode a new radio (NR) Discovery Reference Signal (DRS) transmission, the NR DRS transmission comprising a synchronization signal block (SSB), remaining minimum system information (RMSI) control resource set (CORESET), and RMSI, mapping to 48 physical resource block (PRBs), wherein the SSB includes a physical broadcast channel (PBCH), primary synchronization signal (PSS), and secondary synchronization signal (SSS); and
configure the UE to determine channel state based on the NR DRS.

20. The apparatus of claim 19, wherein the NR DRS transmission further comprises a channel state information (CSI) reference signal (RS) (CSI-RS), wherein the CSI-RS is a fragmented CSI-RS comprising a first fragmented portion and a second fragmented portion, and wherein said decoding further comprises:
decoding a symbol of the NR DRS transmission to determine the first fragmented portion, a symbol of the SSB, and the second fragmented portion, wherein the symbol of the SSB is encoded on the PBCH of the NR DRS transmission.

* * * * *

UNITED STATES PATENT AND TRADEMARK OFFICE
CERTIFICATE OF CORRECTION

PATENT NO. : 11,949,613 B2
APPLICATION NO. : 17/259102
DATED : April 2, 2024
INVENTOR(S) : Bishwarup Mondal et al.

Page 1 of 1

It is certified that error appears in the above-identified patent and that said Letters Patent is hereby corrected as shown below:

In the Claims

Column 21, Line 17, delete "CSI RS".
Column 22, Line 12, delete "partially the" and insert --partially on the--.

Signed and Sealed this
Eleventh Day of June, 2024

Katherine Kelly Vidal
*Director of the United States Patent and Trademark Office*